Oct. 30, 1956  C. A. FRENCH  2,768,758
TAIL GATE HOISTS FOR TRUCKS
Filed Dec. 20, 1954
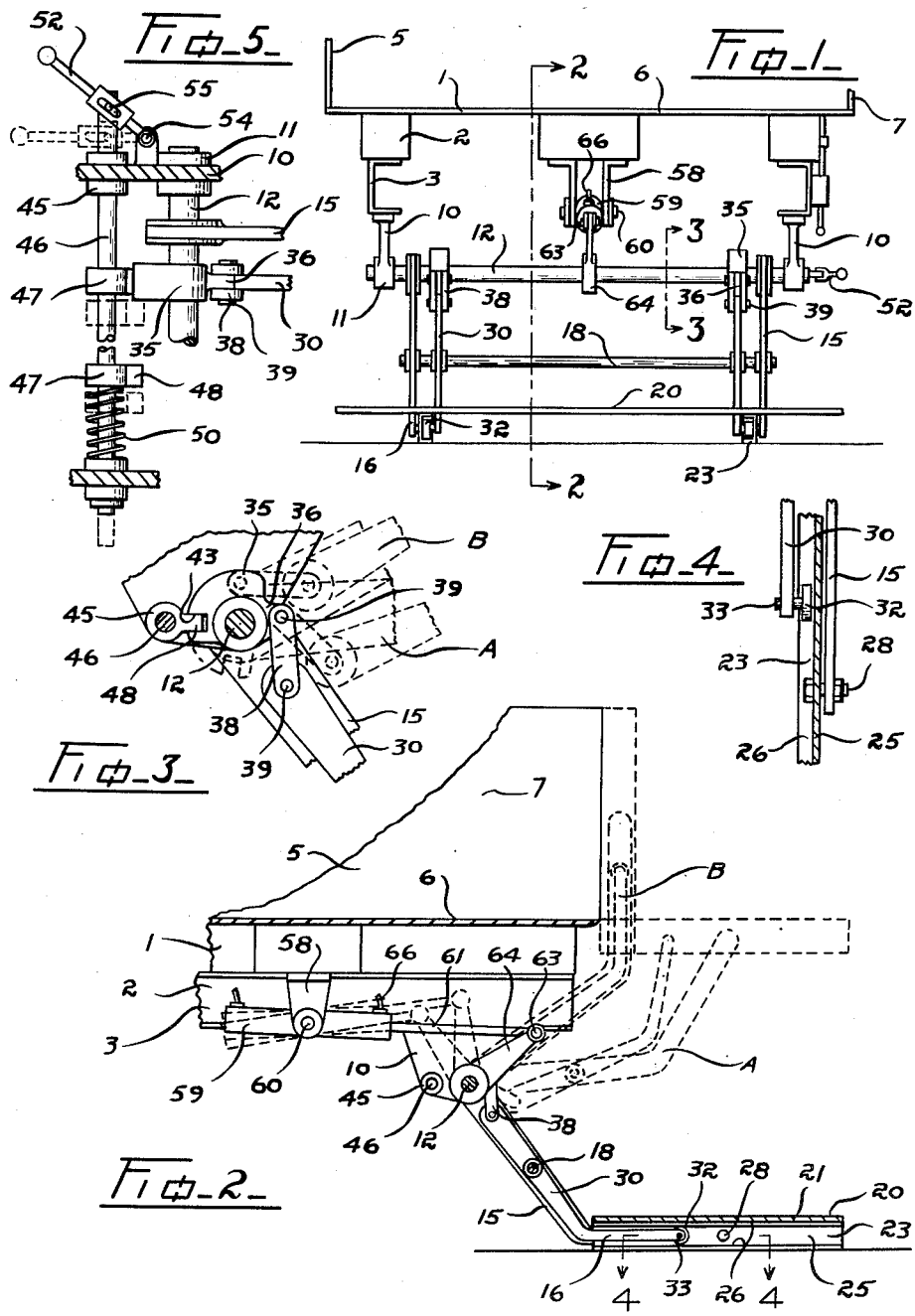
INVENTOR
CHARLES A. FRENCH
ATTORNEY

# United States Patent Office 2,768,758
Patented Oct. 30, 1956

2,768,758
TAIL GATE HOISTS FOR TRUCKS

Charles A. French, Vancouver, British Columbia, Canada

Application December 20, 1954, Serial No. 476,451

5 Claims. (Cl. 214—77)

My invention relates to improvements in tail gate hoists for trucks.

This invention relates to a hoisting structure which is adapted to be combined with the tail gate of a truck body whereby loads may be conveniently raised to or lowered from the level of the truck platform.

The objects of the invention are to provide a device of this nature wherein the tail gate is supported along its transverse centre rather than at its forward edge only; to provide a tail gate which may be raised to platform level by rocking movement imparted to a single shaft, and to provide means whereby continued rotation of said shaft in the same direction will swing the gate to a vertical position to form an end closure for the truck body.

Referring to the accompanying drawings:

Figure 1 is a rear elevational view of a truck fitted with the invention.

Figure 2 is a longitudinal sectional view, taken on the line 2—2 of Figure 1.

Figure 3 is an enlarged sectional view, taken on the line 3—3 of Figure 1.

Figure 4 is a sectional plan view, taken on the line 4—4 of Figure 2.

Figure 5 is an enlarged fragmentary plan view, part in section, showing the means for releasing the rocking arm disks to permit the tail gate to be swung to a vertical position.

In the drawings like characters of reference indicate corresponding parts in each figure.

The numeral 1 indicates the rear portion of a truck having a chassis 2 provided with longitudinal frame members 3 and supported upon said chassis is a body 5 having a platform 6 which is surmounted by sides 7. Secured beneath the frame members 3 are brackets 10 which are fitted with transversely aligned bearings 11 and rockingly mounted in said bearings is a shaft 12. Non-rotatably secured to the shaft is a pair of spaced rearwardly extending lifting arms 15 having horizontal portions 16, which arms are connected by a transverse rod 18. The arms support a tail gate 20 consisting of a rectangular panel 21 which is fitted on its underside with spaced longitudinal members 23. The members are preferably of channel section to provide a vertical web 25 and inwardly projecting horizontal flanges 26. At the transverse centre of the tail gate the members 23 are fitted with bolts 28 which project outwardly from the webs 25 and are pivotally connected to the free ends of the horizontal portions 16 of the arms 15.

Adjacent each of the arms 15 is a rocking arm 30 which is swingingly mounted on the transverse rod 18. The rocking arms are somewhat shorter in length than the lifting arms and are similarly cranked to conform to the shape of said lifting arms. A roller 32 is journalled upon a pin 33 extending outwardly from the free end of each of the arms 30 and said roller is disposed between the flanges 26 of the members 23 and is adapted to move therebetween.

Rockingly mounted upon the shaft 12 in alignment with the arms 30 are disks 35, each of which are provided with a lug 36. Each disk is connected to an adjoining rocking arm by a pair of links 38 which are pivotally mounted in the lugs and the upper end of an adjacent arm by means of pins 39. The disks are each provided with a transverse groove 43.

The brackets 10 are provided with sleeves 45 and slidably but non-rotatably mounted in said sleeves is a control rod 46 which is disposed forwardly of the shaft 12. The control rod is fitted with spaced non-rotatable collars 47 having rearwardly projecting tongues 48 which are adapted to enter the grooves 43 and are retained therein by means of a spring 50 mounted upon the rod between one of said collars and an adjacent sleeve 45, see Figure 5. A control lever 52 is hingedly mounted upon a lug 54 projecting from one of the brackets 10 and said lever is operatively connected as at 55 to the adjoining end of the shaft 12.

Depending from a suitable part of the chassis 2 is a centrally disposed pair of brackets 58 between which a hydraulic cylinder 59 is mounted upon trunnions 60. The piston rod 61 of the cylinder extends towards the rear of the truck body and and is connected by a pin 63 to a crank 64 which is secured to the shaft 12. The cylinder 59 is connected by lines 66 to a suitable source of fluid pressure.

It will be noticed that when the platform is lowered for loading as shown in Figures 1 and 2, the members 23 are resting upon the surface of the ground, the arms 15 and 30 are transversely aligned and the tongues 48 are engaged in the grooves 43, so that the disks 35 cannot rotate. With the load upon the gate the cylinder 59 is operated, so that the piston rod is retracted in its cylinder 59 and the shaft 12 is rocked in an anti-clockwise direction as viewed in Figure 2 to raise the tail gate to the level of the platform 6 as shown in the dotted line position at A in Figures 2 and 3. During this movement the links 38 permit the rocking arms to pivot about the rod 18 to a limited extent only and the rollers 32 are caused to traverse the members 23 an appropriate distance so that the tail gate is rocked about the bolts 28 and is retained in a horizontal position during its entire travel to position A. The article upon the gate is moved onto the truck platform and assuming it to be the last of the cargo to be loaded the tail gate is closed in the following manner. It will be noticed that the forward edge of the gate now abuts the rear edge of the body 5. The lever 52 is swung to the dotted line position of Figure 5 to compress the spring 50 and move the tongues out of engagement with their grooves 43 so that the collars 35 are free to rotate. Immediately following the movement of the control lever the shaft 12 is again rocked in the same anti-clockwise direction, thus causing the gate to pivot about the rear edge of the platform, so that when the arms 15 reach the uppermost limit of their travel the tail gate is disposed in a vertical position and is supported against the sides 7 of the body 5. This position of the tail gate, the several arms and their associated parts is shown in dotted line at B in Figures 2 and 3 and during the movement of the arms from A to B the disks 35 are rocked by the links 38 to the dotted line position shown in Figure 3. The control lever 52 may, if desired, be released immediately following the initial rocking movement of the disks, so that the tongues 48 are held by the action of the spring 50 against said disks. When the tail gate is again lowered, the tongues continue to bear against the disks which are thus caused to lag behind the clockwise rotation of the shaft 12. This lag is transferred through the links 38 to the arms 30 which rock about the rod 18 and move the rollers 32 along the members 23, so that the tail gate is swung about the bolts 28 from a vertical to a horizontal position. As the gate reaches the level of the truck platform, the grooves 43 come into register with their complementary tongues which are urged by the spring 50 into locking engagement therewith, thus holding the disks against rotation during movement of said tail gate from position A to ground level or return.

What I claim as my invention is:

1. A tail gate hoist for trucks comprising a transverse shaft adapted to be rockingly mounted beneath the rear of a truck platform, a pair of rearwardly extending lifting arms secured to said shaft, a tail gate pivotally connected to the free ends of said arms, a rocking arm pivotally connected intermediate the length of one of said lifting arms and adapted for swinging movement in a plane parallel thereto, the free end of said rocking arm being operatively and slidably connected to the tail gate, a disk rockingly mounted upon said shaft, a link pivotally connected to said disk and to the adjacent end of said rocking arm, means for rocking the shaft to raise the gate and means for locking the disk against rotation during movement of the tail gate from ground level to the level of the truck platform and for releasing said disk subsequent to it having reached the level of the truck platform.

2. A tail gate hoist for trucks as claimed in claim 1, wherein the tail gate is pivotally connected to the free ends of the lifting arms substantially at its transverse centre.

3. A tail gate hoist for trucks comprising a transverse shaft adapted to be rockingly mounted beneath the rear of a truck platform, a pair of rearwardly extending lifting arms secured to said shaft, a tail gate pivotally connected to the free ends of said arms, a rocking arm pivotally connected intermediate the length of one of said lifting arms and adapted for swinging movement in a plane parallel thereto, the free end of said rocking arm being operatively and slidably connected to the tail gate, a disk rockingly mounted upon said shaft, a link pivotally connected to said disk and to the adjacent end of said rocking arm, a manually operable control rod parallel to said shaft, a locking dog carried by said rod, said dog being adapted to normally engage the disk and hold it against rotation, means for rocking the shaft to raise the tail gate, and means for releasing the locking dog from the disk.

4. A tail gate hoist for trucks as claimed in claim 3, wherein the control rod is spring mounted and the disk is provided with a slot to normally receive the locking dog as the control rod is urged in one direction by its spring and manually operable means for moving the control rod in the opposite direction to withdraw the dog from the slot.

5. A tail gate hoist for trucks comprising a transverse shaft adapted to be rockingly mounted below the level of the truck platform, a pair of rearwardly extending arms secured to said shaft, a tail gate pivotally connected to the free ends of the arms, a rocking arm pivotally connected intermediate the length of one of said lifting arms and adapted for swinging movement in a plane relative thereto, the free end of said rocking arm being operatively and slidably connected to the tail gate, a normally stationary disk rockingly mounted upon the shaft, a link connecting the disk to an adjacent end of the rocking arm, means for releasing the disk for rocking movement about the shaft, the free end of the rocking arm being adapted to be held against sliding movement with the tail gate when the disk is held against rotation about the shaft and to slide relative to the tail gate when said disk is set to rotate about said shaft, and single means for imparting movement of the tail gate up to platform level and for subsequently swinging said tail gate towards a vertical position.

References Cited in the file of this patent

UNITED STATES PATENTS

| | | |
|---|---|---|
| 1,113,191 | Breese | Oct. 13, 1914 |
| 1,429,004 | Wick | Sept. 12, 1922 |
| 2,576,881 | Kern | Nov. 27, 1951 |
| 2,626,067 | Berford et al. | Jan. 20, 1953 |
| 2,725,152 | Gwinn | Nov. 29, 1955 |